Sept. 4, 1956
W. HOBKIRK
2,761,266
RACE HORSE HOPPLE
Filed May 20, 1954
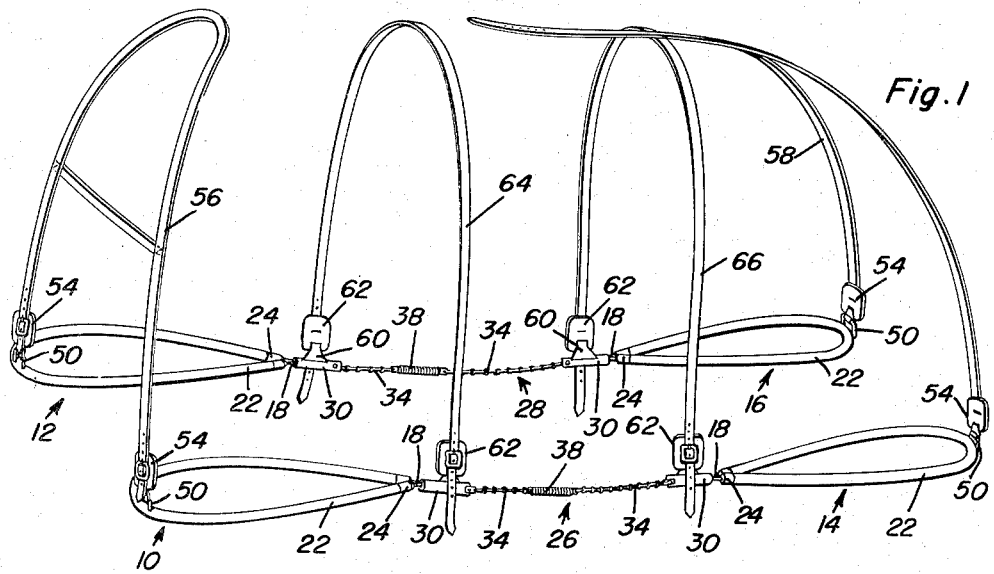
Fig. 1
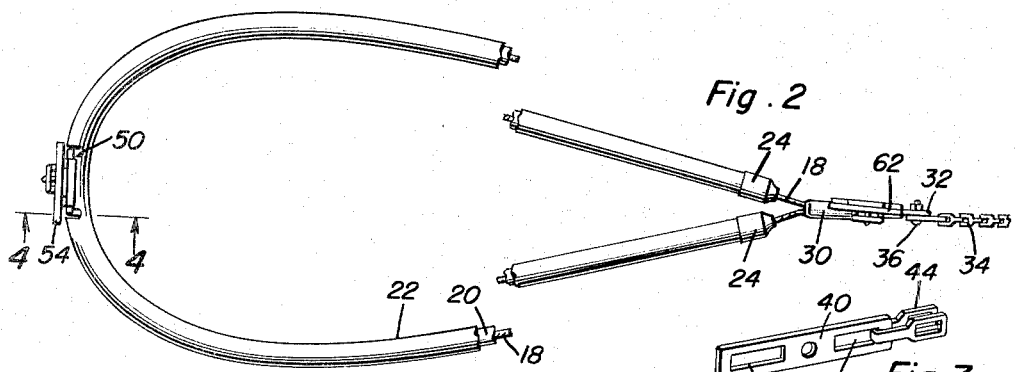
Fig. 2
Fig. 7
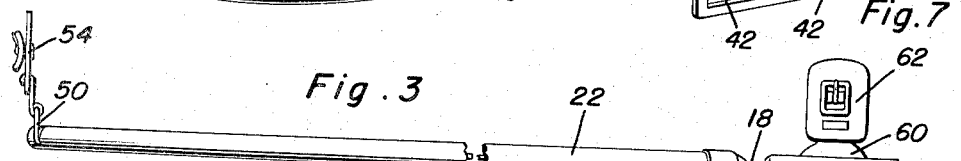
Fig. 3
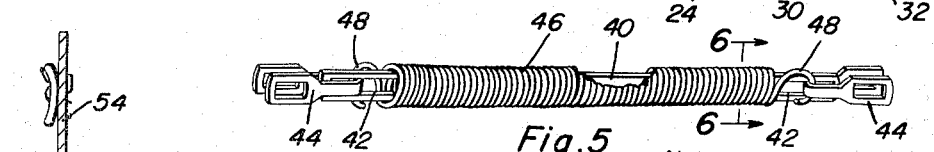
Fig. 5
William Hobkirk
INVENTOR.
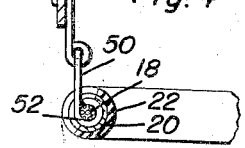
Fig. 4
Fig. 6
BY *Clarence A. O'Brien*
and *Harvey B. Jacobson*
Attorneys

United States Patent Office 2,761,266
Patented Sept. 4, 1956

2,761,266

RACE HORSE HOPPLE

William Hobkirk, Ogdensburg, N. Y.

Application May 20, 1954, Serial No. 431,200

5 Claims. (Cl. 54—71)

This invention relates to a race horse hopple and more particularly to an improved hopple for controlling the gait of pacing horses.

An object of this invention is to provide a race horse hopple in which the midportion thereof is provided with means to absorb the shock of a hard pacing stride without throwing the horse off gait.

Another object of this invention is to provide a race horse hopple which is light in weight but is strong enough to withstand safely the required shock and strain normally imparted to a hopple.

A further object of this invention is to provide a race horse hopple having novel means for securing the carrying harness thereto.

A yet further object of this invention is to provide a race horse hopple formed of a material which will not be affected by heat, moisture and sweat and which does not pick up and carry dust and dirt particles as does the usual leather hopple.

A still further object of this invention is to provide a race horse hopple which will not tend to rub, chaff or pull the hair of the horse when the hopple is positioned thereon.

An additional object of this invention is to provide an improved race horse hopple which is simple and efficient in construction and durable and lasting in use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the hopple harness suitable for a pacer;

Figure 2 is an enlarged top plan view partly broken away showing one of the leg loops of the hopple forming the subject of this invention;

Figure 3 is a side elevational view of the leg loop shown in Figure 2;

Figure 4 is an enlarged sectional view taken substantially along the section line 4—4 of Figure 2;

Figure 5 is an enlarged perspective view of the resilient means for connecting the leg loops together;

Figure 6 is an enlarged sectional view taken substantially along the section line 6—6 of Figure 5; and Figure 7 is a perspective view of a modified member for connecting the leg loops together.

Referring now more specifically to the accompanying drawings, it will be seen that the improved race horse hopple forming the subject of this invention includes a pair of front leg loops 10 and 12 and a pair of rear leg loops 14 and 16. Each of the loops is formed of a flexible inextensible cable 18 having the ends thereof joined together by any suitable means, such as welding or the like.

The cables 18 are covered by a layer 20 of resilient material, such as rubber, and the layer 20 is, in turn, covered by a layer 22 of suitable material, such as plastic.

Caps 24 of material similar to that of layer 22 seal the ends of the layers 20 and 22 to the cables 18.

Means are provided for securing each of the front leg loops to one of the rear loops. This means comprises a member 26 which secures loop 10 to loop 14 and a member 28 which secures loop 12 to loop 16. Inasmuch as the construction of members 26 and 28 is the same, an explanation of one of the members will be given here.

The member 26 consists of a pair of sleeves 30 which are adapted to receive the welded ends of the cables 18. The sleeves 30 are fixedly secured to the ends of the cables. Each of the sleeves 30 is provided with a flattened portion 32 at one end and to which is secured a length of chain 34. Suitable fasteners 36 extend through the chain 34 and the flattened portions 32 for securing the chains in position on the sleeves 30. A spacer member, indicated generally by the numeral 38 in Figure 1, joins the free ends of the chains 34 together.

The spacer member 38 is formed of an elongated rigid member 40, as seen in Figure 7. The member 40 is provided with a pair of longitudinally extending apertures 42 extending therethrough. A link 44 of the chain 34 is adapted to have a portion thereof received in the aperture 42 for sliding movement therein.

As seen in Figure 5, means can be provided for resiliently urging the free ends of the chains 34 together. This means comprises a coil spring 46 disposed on the spacer member 40 and extending longitudinally thereof. The coil spring 46 is provided with hook portions 48 at opposite ends thereof, which hook portions are adapted to engage the links 44 for resiliently urging the links together. Either of the spacer members shown in Figure 5 or 7 can be used, depending upon the desires of the trainer of the horse.

In order to support the leg loops in position on a horse, means are provided thereon for securing a carrier harness thereto. This means comprises a substantially U-shaped bracket 50 which is adapted to be secured to the cables 18 intermediate the length thereof. The U-shaped brackets 50 have the free ends of the leg portions thereof provided with a hook portion 52 for surrounding the cables 18 for attaching the bracket 50 thereto. Buckle units 54 may be attached to the web portion of the U-shaped brackets 50 for attaching the carrier harness thereto. The buckle units 54 on the leg loops 10 and 12 provide means whereby a neck strap 56 may be secured to the front leg loops. The buckle units 54 attached to the leg loops 14 and 16 provide means whereby a rear carrying strap 58 may be secured to the rear leg loops 14 and 16.

Each of the sleeves 30 is provided with a bracket 60 which has mounted thereon a buckle unit 62. A front carrying strap 64 is secured to the buckle units 62 which are mounted on the sleeves 30 attached to the front leg loops 10 and 12. A rear carrying strap 66 is secured to the buckle units 62 which are supported on the sleeves 30 which are attached to the rear leg loops 14 and 16.

In practical use of the device, the leg loops 10, 12, 14 and 16 are placed in position on the legs of a horse and the carrying straps are attached thereto. The length of the members 26 and 28 is adjusted by removing or adding links to the chain 34. When the device is used with the spacer member as shown in Figure 7, a slight amount of play will be allowed in the members 26 and 28 due to the movement of the links 44 of the chain within the apertures 42. When the resilient means as shown in Figure 5 is used in connection with the spacer member 40, the free ends of the chains 34 will be urged together to remove any slack therefrom. Should the horse take a greater stride, the shocks imparted to the hopple would be taken up by the spring 46.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A shock absorbing race horse gait controlling hopple for use with a carrier supported on the race horse comprising front and rear leg loops for attaching carrier straps thereto, and resilient adjustable gait control means operably engageable between said front and rear leg loops, said means comprising an elongated spacer member having a pair of elongated longitudinal apertures in each end, a bifurcated link element including a bight portion longitudinally slidably carried in said elongated apertures, a tension spring element including an end operably connect to each of the bight portions of said link elements for resiliently urging said link elements within said elongated apertures toward each other, and flexible, adjustable, non-extensible connecting means operably secured to the bifurcated link elements and a leg loop, said hopple permitting a maximum control gait of the horse with which the hopple is utilized and preventing sudden shocks to the animal when said gait is restrained at its maximum length.

2. In a gait controlling hopple as set forth in claim 1 wherein said leg loops comprise flexible non-extensible cable portions including a non-absorbent flexible covering thereover, and a resilient shock absorbing material between said cable and covering.

3. The gait controlling hopple as set forth in claim 1 wherein said flexible, adjustable, extensible means comprises a plurality of detachable links forming a link chain.

4. A gait controlling hopple as set forth in claim 1 wherein said leg loops terminate in sleeve elements operably connected to the flexible, adjustable, non-extensible connecting means.

5. A gait controlling hopple as set forth in claim 4 wherein said leg loops and sleeves include adjustable connecting means thereon for the attachment of carrier straps thereto.

References Cited in the file of this patent

UNITED STATES PATENTS

| | | |
|---|---|---|
| 444,032 | Whitaker | Jan. 6, 1891 |
| 484,646 | Shaw | Oct. 19, 1892 |
| 594,502 | Trice | Nov. 30, 1897 |
| 823,504 | Bransfield | June 19, 1906 |
| 1,212,023 | Curley | Jan. 9, 1917 |
| 2,670,951 | Lucky | Mar. 2, 1954 |

FOREIGN PATENTS

| | | |
|---|---|---|
| 460,636 | France | Oct. 10, 1913 |
| 25,686/35 | Australia | Nov. 4, 1936 |
| 893,564 | France | Feb. 7, 1944 |